SIGNAL RECEIVER FOR MARK AND SPACE CODED SIGNALS

Filed Jan. 3, 1958 4 Sheets-Sheet 1

INVENTORS
James D. Durkee
and Clarence H. Stewart
BY Burns, Doane, Benedict & Irons
ATTORNEYS

SIGNAL RECEIVER FOR MARK AND SPACE CODED SIGNALS

INVENTORS
James D. Durkee
and Clarence H. Stewart
BY Burns, Doane, Benedict & Irons
ATTORNEY

SIGNAL RECEIVER FOR MARK AND SPACE CODED SIGNALS

Filed Jan. 3, 1958 4 Sheets-Sheet 3

INVENTORS

James D. Durkee
and Clarence H. Stewart

BY Burns, Doane, Benedict & Irons

ATTORNEYS

SIGNAL RECEIVER FOR MARK AND SPACE CODED SIGNALS

Filed Jan. 3, 1958 4 Sheets-Sheet 4

INVENTORS
James D. Durkee
and Clarence H. Stewart
BY Burns, Doane, Benedict & Irons
ATTORNEYS United States Patent Office 2,995,628
Patented Aug. 8, 1961

2,995,628

SIGNAL RECEIVER FOR MARK AND SPACE CODED SIGNALS

James D. Durkee, Springbrook, Ark., and Clarence H. Stewart, Evanston, Ill., assignors, by mesne assignments, to Bell & Gossett Company, Morton Grove, Ill., a corporation of Illinois Filed Jan. 3, 1958, Ser. No. 707,018
9 Claims. (Cl. 178—88)

Figure 1:
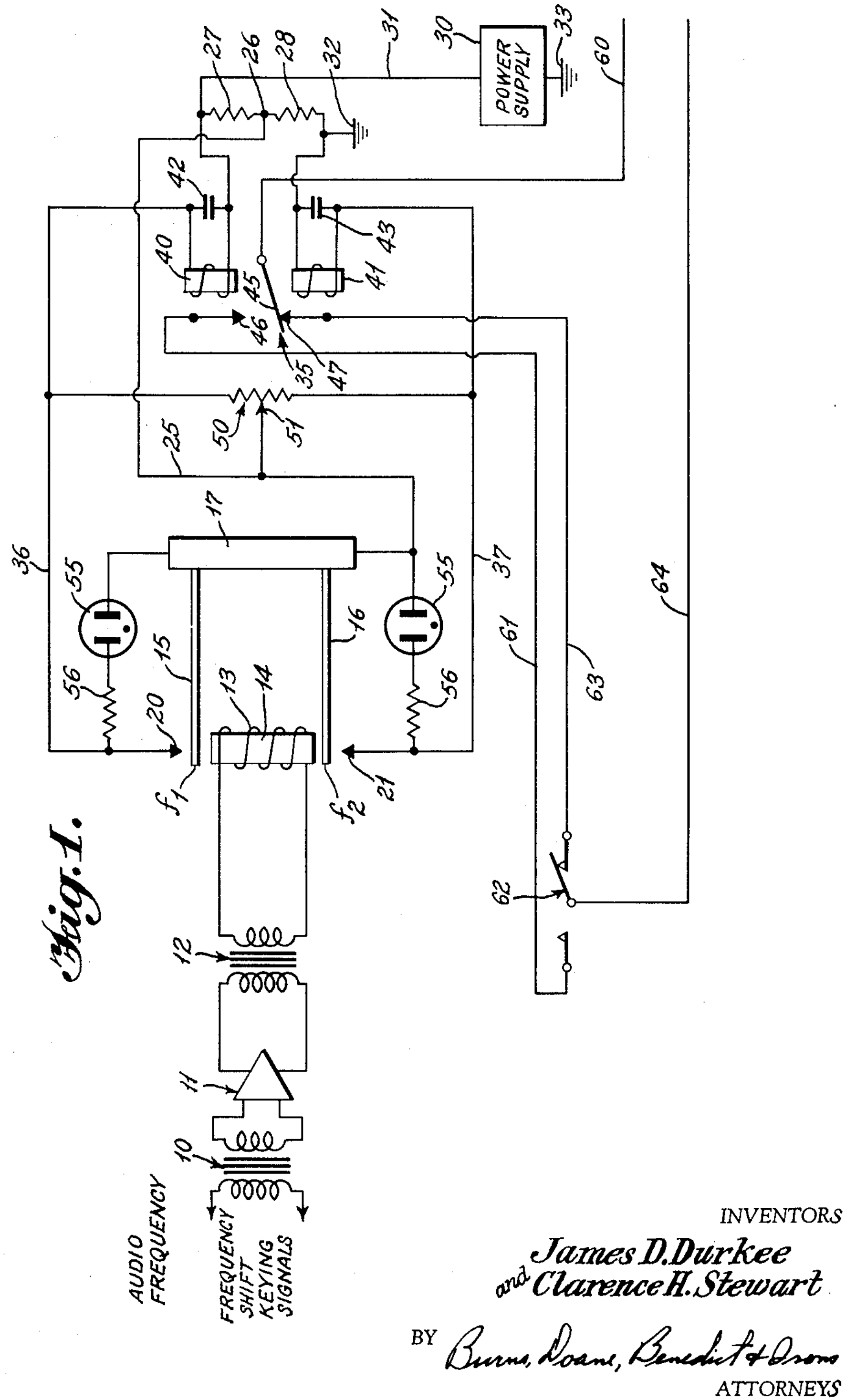

This invention relates generally to a receiver for code signals made up of distinguishable space and mark signals. More specifically, the invention as hereinafter set forth is directed to such a receiver for frequency shift keying wherein the code signals are made up of distinguishable space and mark frequencies and further embodying an improved synchronizing circuit for the receiver to reliably translate the intelligence of the coded signals as sent from the transmitting station.

In certain types of telegraphic signaling, either by wire or radio transmission, mark and space signals of two different current conditions are employed. These current conditions may be current and no-current, positive and negative current, current of two different frequencies or magnitudes, etc.

The present invention is particularly directed to reception of two tone or frequency modulation telegraph signals in which these signals are formed by transmitting successively brief pulses of one or the other of two frequencies. Such telegraphic transmission is commonly referred to as frequency shift keying with the two conditions being distinguished by discrete marking and spacing frequencies. As a further salient facet of this invention there is provided a synchronizing circuit having general utility in receiving and translating coded signals where the marking and spacing signals are distinguishable by current and no-current signals.

With further regard to this synchronizing circuit, the instant invention has particular applicability in the receipt of conventional teleprinter signals under the five unit Baudot code. Such signals conventionally include a start pulse in the form of a space signal followed by five code pulses of various combinations and permutations of mark and space signals with a stop pulse in the form of a mark signal at the end thereof. The thirty-two characters coded in accordance with the Baudot code are represented by combinations and permutations of mark and space signals in the five code signals sequentially transmitted between the start and stop signals.

A particular problem encountered in the use of code receivers for so-called frequency shift keying signals has been the inability to obtain reliable receipt and interpretation of the two frequency signals in the proper sequence as originally transmitted. This problem is especially critical in teleprinter systems using frequency shift keying in the low and very low frequency range. In the frequency spectrum of between 30,000 and 300,000 cycles per second, the omnipresent random noise level, due largely to the favorable propagation characteristics of these frequencies, has heretofore been a drawback to the use of frequency shift keying teleprinter systems within this frequency range. For example, research into atmospheric noise sources indicates that the main lightening discharge in the subtropics has a center freqeuncy of approximately 11,000 cycles per second. Since these discharges are at a very high power level and are very rich in harmonic content so that they are propagated over great distances, the low order harmonics of these discharges fall within the very low and low frequency bands with the consequence that there generally is a relatively high noise level on these frequencies. This random noise tends to block out or make undiscernable transmitted frequency shift keying signals. Accordingly, even though this particular portion of the radio frequency spectrum has desirable propagation characteristics, its use to date has been rather limited. The instant invention seeks to provide a receiver for frequency shift keying signals falling within this low frequency and very low frequency range where the omnipresent noise level is effectively cancelled to be ineffective in obstructing proper and reliable operation of the receiver in translating the coded signals.

In both frequency shift keying and current–no-current keying, a type of binary coding is employed such that some means of synchronization between the transmitter and receiver is required. Heretofore this requirement for synchronization has necessitated the provision of an elaborate and cumbersome power supply at the receiver to insure synchronization of a rotary recieving distributor with a corresponding distributor at the transmitter at a remote locate. Such a synchronized rotary receiving distributor is employed to apply the sequentially received signals to a recorder or other receiving device to translate the intelligence conveyed by such signals into the matter originally applied to the transmitter.

In certain types of telegraph communication systems, it is highly important that the receiving equipment be compact and light in weight. For example, in radio communication between airplanes and airports, the matter of size, weight and simplicity of receiving apparatus required in the planes is of great importance. The provision of a special source of power such that the motors will drive the rotary receiving distributors at a constant speed substantially in synchronism with the incoming signals is a critical problem in aircraft telegraphic communications. Not only the weight of such a special power supply but also the power consumption of elaborate frequency control systems are drawbacks. The instant invention seeks to provide a synchronizing circuit which is simple and light weight and which overcomes the necessity for the provision of a special carefully controlled power supply at the receiver.

In recognition of the hereinabove discussed problems, it is a primary object of the instant invention to provide an improved telegraphic signaling receiver for signals made up of distinct mark and space signals combined to intelligibly represent characters in accordance with the five unit Baudot code.

It is a further object of the instant invention to provide an improved code receiver for frequency shift keying wherein the omnipresent random noise level is minimized to overcome the effect thereof on reliable and accurate receiver operation.

An additional object of the invention is to provide in a code receiver a frequency shift keying converter wherein a pair of vibratory reed elements tuned to respond to the distinguishable mark and space signal frequencies are employed and the vibratory response of such elements to the signals integrated and differentially compared in bistable relay means to achieve improved reception reliability in overcoming random noise interference with the code signals.

Another object of the instant invention is to provide a receiver for frequency shift keying signals in accordance with the above object wherein bias in the mark and space signals may be readily compensated for.

It is also an object of the instant invention to provide a telegraphic signaling receiver for signals made up of mark and space signals provided with a synchronizing circuit for proper sequential receipt and translation of the signals without a separate elaborate controlled frequency power supply for the receiver being required.

An additional object of this invention is to provide a code receiver for signals made up of distinguishable mark and space signals wherein synchronized operation with the sequential code signals is obtained with low power requirement and the receiving equipment is passive except during signal reception.

Figures 2, 3:
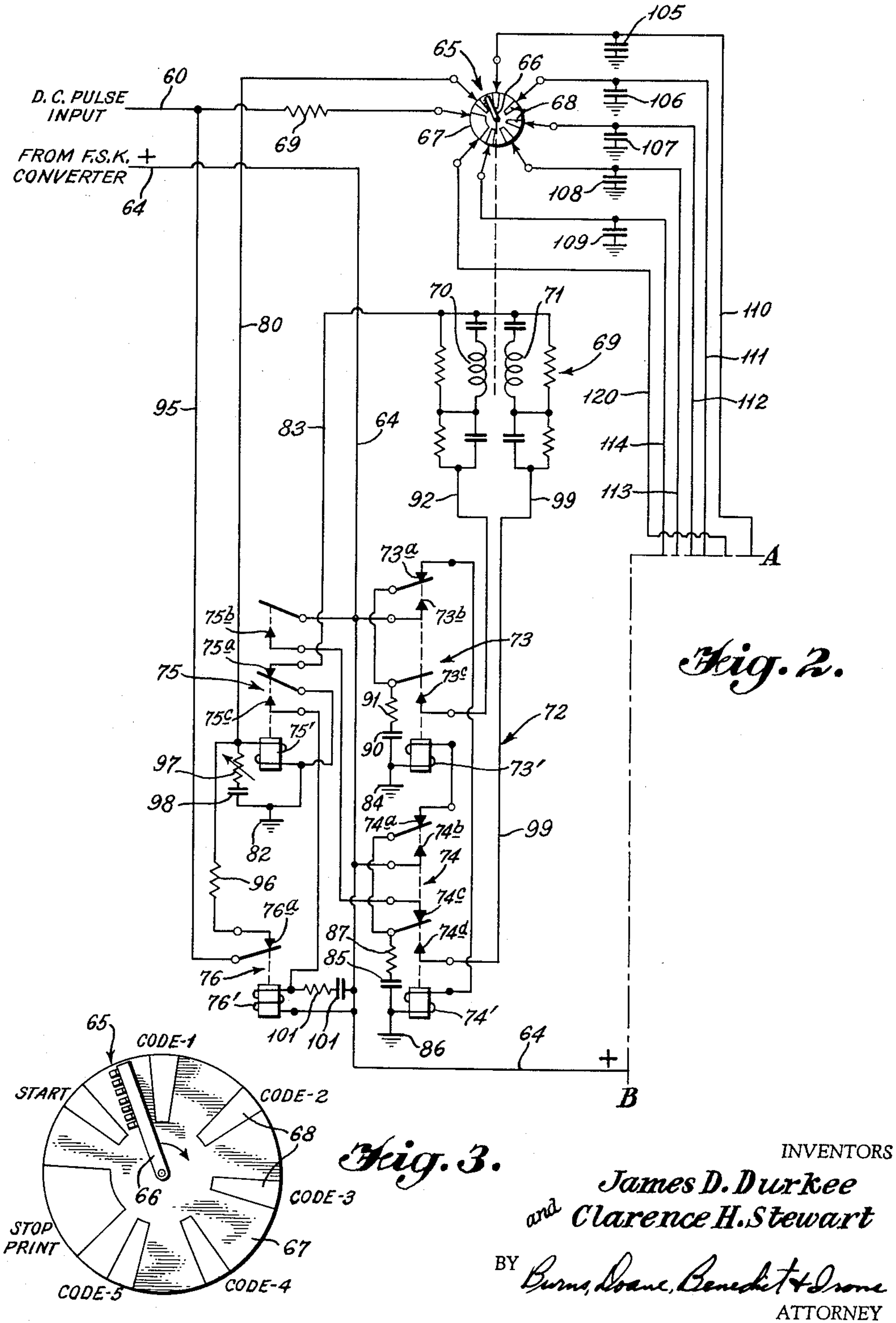
Figure 4:
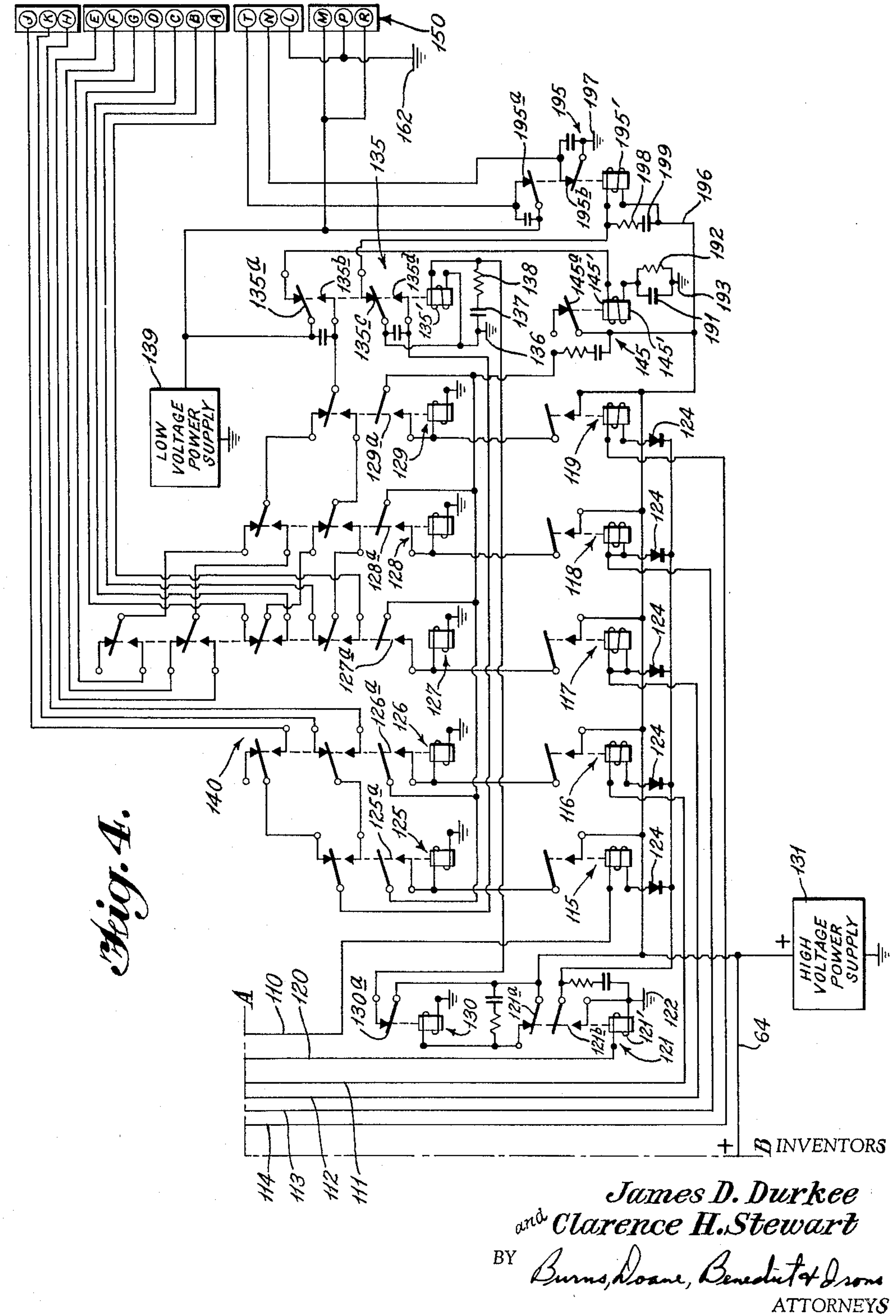
Figure 5:
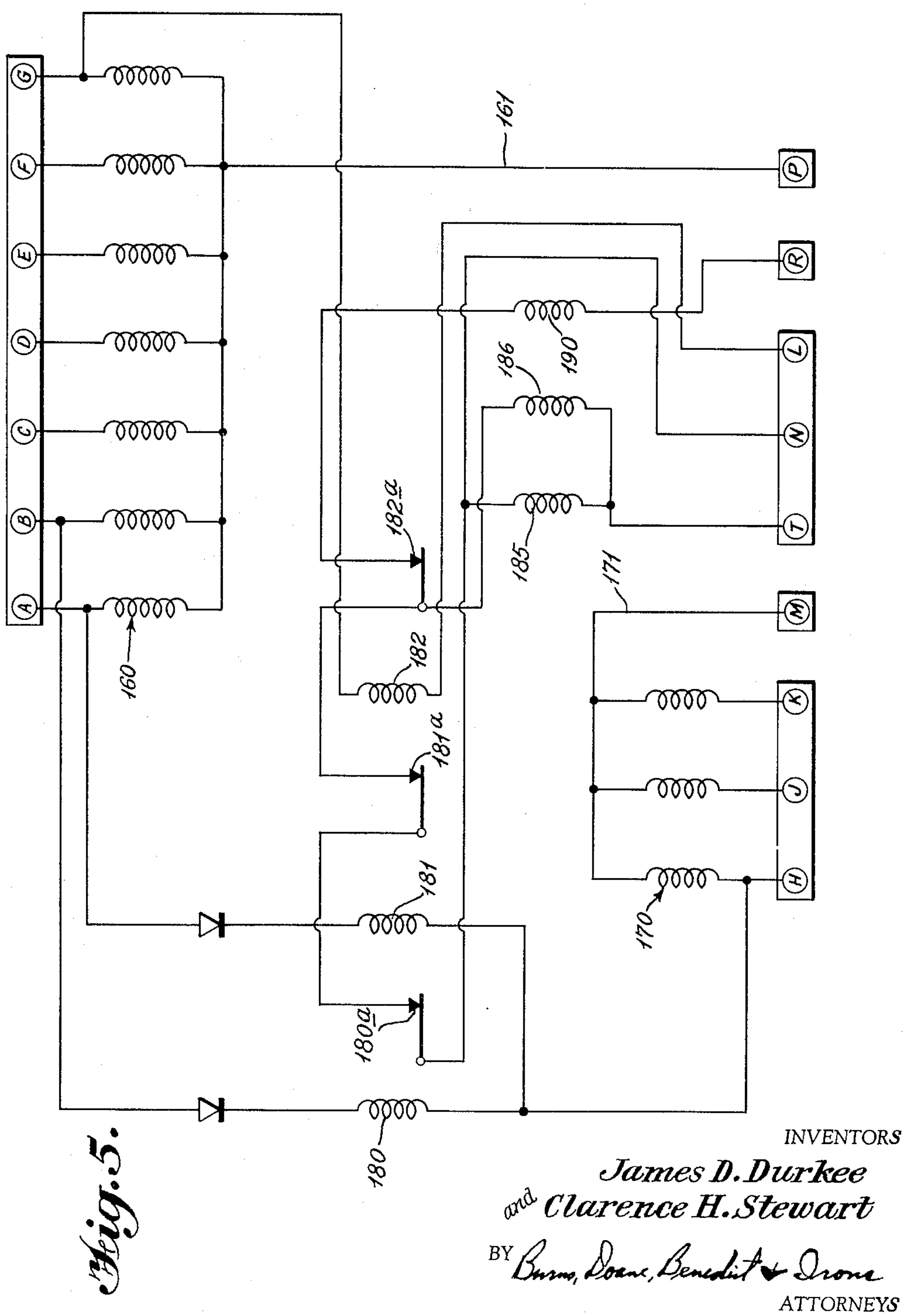

The above objects and other more specific objects of the invention will be apparent by reference to the following detailed description of a preferred embodiment of the invention. Whereas a specific embodiment is illustrated on the accompanying drawings, it will be recognized that within the scope of the appended claims, other circuits and equivalents may be employed within the contemplation of the instant invention. The detailed description is given in connection with the accompanying drawings in which:

FIGURE 1 is a circuit schematic showing the frequency shift keying converter portion of a code receiver constructed in accordance with the instant invention, FIGURE 2 is a circuit schematic of the synchronizing circuit portion of the code receiver connected to the output of the receiver portion shown in FIGURE 1, FIGURE 3 is a diagrammatic view illustrating the construction of the distributor embodied in the circuit schematic of FIGURE 2, FIGURE 4 is a circuit schematic showing a further portion of the receiver relating to the signal translating means as connected along line A—B to the circuit schematic of FIGURE 2, and FIGURE 5 is a circuit schematic of a suitable teleprinter effective to reproduce the intelligence of the code signals in printed form.

Before setting forth in detail a description of the circuits and interrelationship thereof as shown on the drawings, a brief summary of the content of the individual figures of the drawings will be given. FIGURE 1 generally depicts the initial input circuit to which the frequency shift keying signals are applied and wherein such signals are converted from mark and space signals of distinguishable frequencies to mark and space signals of current and no-current character. FIGURE 2 depicts the synchronizing circuit to which the current and no-current signals at the output of the FIGURE 1 circuit are applied. The output from the distributor in the synchronizing circuit in FIGURE 2 is applied through the connections along line A—B to the leads on the circuit of FIGURE 4. FIGURE 4 reflects a suitable translating circuit whereby the sequential Baudot code signals representing each character are translated for appropriate application to operate the teleprinter solenoids and effect printing of each character by the circuit shown in FIGURE 5. It may be noted at this point that the circuit of FIGURE 5 and a portion of the circuit of FIGURE 4 illustrate circuit characteristics for a teleprinter coupled with the other receiver components. Such a suitable teleprinter is more fully disclosed in James D. Durkee Patent No. 2,742,532, issued April 17, 1956.

Referring to the frequency shift keying converter circuitry as shown on FIGURE 1, the audio frequency input containing the frequency shift keying signals in the form of discrete and distinguishable mark and space frequency signals is applied through a suitable band-pass filter and transformer 10. The signals are introduced to a limiter-amplifier 11 which maintains the signal level within very close limits. The output thereof is applied through a transformer 12 to the drive coil 13 of signal frequency distinguishing means. Coil 13 has associated therewith a magnetizable core 14.

It will be appreciated that where radio transmission is employed an appropriate radio receiver (not shown) is provided with the output thereof providing the audio frequency connected to the input of band-pass filter and transformer 10. On the other hand, where wire transmission is employed, the transmission line may apply the signals directly.

A vibratory reed element 15 and a vibratory reed element 16 are provided with one end of each of such elements rigidly mounted in a base 17. The reed 15 is tuned to vibrate at a resonant frequency $f^1$ and the reed 16 is tuned to vibrate at a resonant frequency $f^2$. The resonant vibratory frequencies of these two reeds correspond to the distinguishable space and mark frequencies employed in the frequency shift keying as transmitted from a suitable transmitting station.

Merely by way of example, if it be considered that 170 cycle frequency shift keying is to be detected as embodied in the transmitted signals, the $f^1$ frequency may be 700 cycles per seocnd and the $f^2$ frequency 870 cycles per second. Thus, the element 15 will have a resonant frequency of 700 cycles representing the space frequency and element 16 will have a resonant frequency of 870 cycles representing the mark frequency.

The elements 15 and 16 are of magnetic material to be excited by signals in coil 13 and core 14 associated therewith. Thus, when the audio frequency signals as applied to drive coil 13 contain a frequency component corresponding to $f^1$, element 15 will be excited to vibration. Similarly, when such signals contain a frequency component corresponding to $f^2$, the element 16 will be excited to vibration. It may be pointed out that unavoidably omnipresent random noise will result in some excitation of elements 15 and 16. However, general random noise frequency components will result in more or less equal vibratory excitation of both elements 15 and 16 and, as pointed out hereinafter, these general noise frequency compoents are effectively cancelled to avoid mis-operation of the code receiver.

Each vibratory element 15 and 16 has a circuit closing means associated therewith. As shown on FIGURE 1, a contact 20 is positioned adjacent the free vibratory end of element 15 and a contact 21 is positioned adjacent the free vibratory end of element 16. The elements are electrically conductive and the common base 17 on which such elements are mounted is connected by lead 25 to the midpoint 26 of a voltage divider, including resistor 27 and resistor 28. One end of resistor 27 is connected to a power supply 30 by lead 31 and one end of resistor 28 is connected to ground at 32. The other side of the power supply 30 is suitably grounded at 33.

The contacts 20 and 21 are connected in the operating circuits of a bistable relay 35 by leads 36 and 37 respectively. Bistable relay 35 has a pair of relay operating coils 40 and 41. A capacitor 42 is connected in parallel with coil 40 and a capacitor 43 connected in parallel with coil 41. Energization of relay coils 40 and 41 operates armature 45 of the bistable relay which is movable between an output contact 46 and an output contact 47.

The operation of such a bistable relay as shown at 35 is well recognized. The armature 45, in the absence of energization of either coil 40 or 41, will remain in a stable condition. As shown, such armature is in circuit closing relation with output contact 47. Upon energization of coil 40 without energization of coil 41, the armature will be moved from the position as shown into circuit closing relation with output contact 46. The armature will remain stable in this new position until energization of coil 41. Thus, the feature of the bistable relay is its characteristic of remaining in either of two stable output conditions until moved from one to the other of such stable conditions by energization of the appropriate operating circuit of the bistable relay.

Although, as specifically illustrated and described, an electro mechanical bistable relay has been disclosed, it will be appreciated that as used in the claims the term bistable relay means shall embrace other equivalent circuits having bistable characteristics where the output may be changed between two stable output conditions by application of energization pulses to the bistable relay means circuit.

Describing the functioning of the heretofore mentioned circuitry, it will be appreciated that each time the resonant frequency of one of elements 15 or 16 is presented to drive coil 13, that particular element will be excited to vibration to make repetitive contact with its contact 20 or 21. Assuming that frequency $f^1$ is presented to coil 13, element 15 will vibrate effecting repetitive contact with contact 20. Such repetitive contact will result in a charge being built up in capacitor 42 which is in parallel with relay operating coil 40. The extent of charge in this capacitor will be directly proportional to the number of repetitive contacts made by element 15 with contact 20.

At the same time that element 15 is responding to its resonant frequency signal in coil 13, random noise frequency components may excite limited vibration of element 16 such that it makes several contacts with contact 21. This will result in a charge being built up in capacitor 43 which is connected in parallel with relay operating coil 41. Of course, there is just as much likelihood that random noise frequency components will simultaneously cause additional excitation of element 15 to increase the charge applied to capacitor 42.

By the circuit connections and relationship of the operating coils of bistable relay 35, the charges built up in capacitors 42 and 43 are connected in the opposed operating circuits of the bistable relay to obtain a differential operational control of such relay. Thus, in the example above described, the greater charge built up in capacitor 42 will discharge through operating coil 40, resulting in armature 45 being shifted into circuit closing relation with contact 46, whereas the relatively small charge in capacitor 43 will bleed off through coil 41 without changing the armature position.

The function of bistable relay 35, when the frequency $f^2$ of element 16 is applied to coil 13, will be readily appreciated. In such event, the capacitor 43, by reason of the greater number of repetitive contacts of element 16 with contact 21, will be charged more than capacitor 42 and in discharging through coil 41, will operate armature 45 into circuit closing relation with contact 47.

To permit ready compensation for keying bias, i.e., unbalance between the relationship of the marking and spacing signals, a variable resistor 50 is connected between leads 36 and 37 with the sliding tap 51 thereof connected to lead 25. It will be seen that this variable resistor is connected across the reed contacts and that the center point of operation of the relay operating coils 40 and 41 may be adjusted for proper balance in accordance with any keying bias present in the code signals as received.

Primarily for test and operational check purposes, a neon glow tube 55 and series resistor 56 is provided across the circuit closing means associated with each of the vibratory elements 15 and 16.

Reference will now be had to the output from the bistable relay 35. Armature 45 is connected to a lead 60 which extends to the distributor shown on FIGURE 2 and described hereinafter. Contact 46 is connected by lead 61 to one contact of a single pole double throw switch 62 and contact 47 is connected by lead 63 to the other contact of switch 62. The switch arm of switch 62 is connected to lead 64 which extends to the circuit on FIGURE 2 and thence to the power supply 131 shown on FIGURE 4 which provides the current–no-current keying signals which are utilized and translated in the distributor and teleprinter of FIGURES 2–5. The switch 62 provides a simple means for reversing the relationship of the space and mark signals of current and no-current as applied to the distributor of FIGURE 2. With switch 62 in the position as shown, current signals will be applied through lead 60 when armature 45 of bistable relay 35 is as shown in FIGURE 1. When the armature moves into engagement with contact 46, a no-current condition will exist since contact 46 through lead 61 is open at switch 62. Thus, a no-current signal will result.

The operation of bistable relay 35 in conformity with frequency shift keying signals detected by vibratory elements 15 and 16 converts the distinguishable space and mark frequency signals into direct current and no-current signals. These signals are applied through lead 60 to distributor 65 shown on FIGURE 2. Distributor 65 has a movable contactor 66 which moves in a circular arc across the surface of an insulated disc 67. This disc carries a series of output contacts 68. Lead 60 is connected through a resistor 69 to the movable contactor 66.

The details of the distributor 65 are more clearly shown in FIGURE 3. As apparent from this figure, the movable contactor 66 is provided with wiping fingers which successively engage upon rotary movement of said contactor with the output contact 68 carried on the insulated disc 67. The output contacts include, as identified on FIGURE 3, a start contact, five equally spaced code contacts and a stop contact. The stop contact functions, as described hereinafter, to initiate the print operation of the teleprinter of FIGURE 5 to reproduce each character represented by the group of code signals for that character.

The movable contactor 66 is mechanically driven by a pulse actuated drive means in the form of a stepping motor 69. Stepping motor 69 has a pair of actuating coils 70 and 71 and is of a character such that discrete rotation steps are completed by the motor upon the application of voltage pulses to one or the other of coils 70 and 71. A suitable stepping motor for use in conjunction with the synchronizing circuit of this invention to properly drive distributor 65 is provided by the Cyclonome stepping motor as commercially available from Sigma Instruments, Inc., 170 Pearl Street, South Braintree, Massachusetts.

A pulse generator 72 to produce actuating pulses in a predetermined timed sequence and apply them to stepping motor 69 is provided, including a pair of pulse relays 73 and 74. A start relay 75 is provided to initially cock the generator 72 and initiate stepping of motor 69 at the proper time in accordance with the code signal timing. An autostart relay 76 is provided to restart pulse generator 72 and motor 69 to return contactor 66 to the resting or start position in engagement with the start contact in the event of failure of line voltage or other misoperation in proper sequential recepit of the code signals. The functioning of autostart relay 76 will be more apparent from the description given hereinafter.

The relays, 73, 74, 75 and 76 are shown in de-energized position. With the contactor 66 in the resting or start position, a direct current mark signal from the frequency shift converter of FIGURE 1, applied through lead 60 to movable contactor 66, causes current to flow through lead 80 and coil 75′ of start relay 75 to ground 82. It may be pointed out that when code signals are not being sent the line is characteristically maintained in a marking condition. With relay 75 energized, the return path for stepping motor 69 through lead 83 is open at contacts 75a of relay 75. At the same time, contacts 75b are closed to apply voltage from lead 64 to coil 73′ of pulse relay 73 to ground 84 through normally closed contacts 74a and 74c of pulse relay 74. In this condition the capacitor 85 connected to ground at 86 is charged through resistor 87.

Energization of pulse relay 73 opens normally closed relay contacts 73a and closes relay contacts 73b and 73c. Thereupon, voltage is applied from lead 64 through contact 73b to charge capacitor 90 through resistor 91. At the same time, voltage is applied through contacts 73c to lead 92 extending to coil 70 of stepping motor 69. However, since the return for the stepping motor coils through lead 83 is open at contacts 75a, the motor is not immediately actuated.

Energization of start relay 75 effects a further operation by closure of its contacts 75c whereby the coil 76′ of autostart relay 76 is connected to ground 82. Thereupon autostart relay 76 is energized through its connection with the power supply 131 by way of lead 64. This results in its normally closed contacts 76*a* opening to open the circuit including lead 95 which connects with lead 60 and resistor 96 which connects with lead 80.

The first signal reflecting code transmission will be the start signal which characteristically is a space signal. When this start signal arrives the mark signal which maintained start relay 75 energized will cease. Energization of start relay 75 prevented initiation of operation of stepping motor 69. The de-energization of relay 75 is delayed by a delay circuit formed by variable resistor 97 and capacitor 98 connected in parallel with coil 75′ of start relay 75. For reasons which will become more apparent, the release delay provided by variable resistor 97 and capacitor 98 will be preferably approximately 11 milliseconds to retain the distributor in proper synchronism with the timing of received signals. However, by adjusting the resistance of variable resistor 97 the release delay time may be changed to obtain desired operation of the apparatus.

Upon release of start relay 75, the return for the stepping motor 69 through lead 83 is completed by way of relay contacts 75*a*. Also with the release of relay 75, contacts 75*b* are opened removing the voltage applied to coil 73′ of pulse relay 73 through contacts 74*a* and 74*c*. Contacts 73*a* close upon de-energization of pulse relay 73 and thereupon capacitor 90 discharges through resistor 91, contacts 73*a*, coil 74′ of pulse relay 74 to ground 86. This energizes pulse relay 74 to close contacts 74*b* and 74*d*, applying voltage from lead 64 through contacts 74*b* and 74*d* to lead 99 extending to stepping motor coil 71 whereby a stepping voltage pulse is applied to actuate the motor. Since start relay 75 has been released, contacts 75*a* thereof are now closed and accordingly the return for the coils of stepping motor 69 through lead 83 is completed. The energization of pulse relay 74 and closure of contacts 74*b* thereof also charges capacitor 85 through resistor 87.

After discharge of capacitor 90 through resistor 91, pulse relay 74 releases and the charge built up in capacitor 85 during energization of pulse relay 74 is applied through contacts 74*a* to coil 73′ of pulse relay 73. The closure of contacts 74*c* at this time has no effect since contacts 75*b* are open due to the released state of start relay 75. Pulse relay 73 is thus energized and a voltage pulse applied to coil 70 of stepping motor 69 through lead 92 by way of contacts 73*b* and 73*c*. Simultaneously, capacitor 90 is charged through resistor 91. Again when capacitor 85 has discharged through resistor 87, pulse relay 73 will release and the hereinabove events will repeat by capacitor 90 discharging to energize pulse relay 74. Thereafter, as long as start relay 75 is not energized and the power continues, the cycle will repeat, producing successive timed voltage pulses for motor 69.

It will be readily appreciated that the pulses applied alternately through leads 92 and 99 to the coils 70 and 71 of the stepping motor 69 will be in accordance with a predetermined timed sequence in accordance with the RC timing networks provided by resistor 91 and capacitor 90, and resistor 87 and capacitor 85. A cyclic repetition of the stepping of motor 69 will thereby be achieved to move contactor 66 at a predetermined stepping rate successively across the output contacts of the distributor.

As heretofore mentioned, contacts 76*a* remain open during energization of autostart relay 76. This relay is initially actuated by closing of contacts 75*c* of start relay 75 to connect coil 76′ to ground 82. A delay network in the form of capacitor 100 and resistor 101 is connected to retard release of autostart relay 76 after start relay 75 has released to open its contacts 75*c*.

Autostart relay 76 provides protection against stepping motor 69 advancing to one of the code contacts and being unable to return to the start position due to sudden line voltage failure or such voltage dropping to a low value while the distributor is at this position. The release delay provided by capacitor 100 and resistor 101 may be of a magnitude of approximately 200 ms. Thus if a mark signal is not applied energizing start relay 75 within the delay period of autostart relay 76, the autostart relay 76 will release, thereby connecting lead 60 through lead 95, contacts 76*a* and resistor 96 to the coil 75′ of start relay 75. In such condition the next marking signal on lead 60 will energize start relay 75, again conditioning the pulse generator 72 to actuate stepping motor 69 upon release of start relay 75 after reception of a succeeding spacing signal. When such spacing signal is received, start relay 75 releases after the time delay determined by variable resistor 97 and capacitor 98, and the stepping motor 69 is stepped, by operation of pulse generator 72 to the start position with a minimum of lost characters.

The stepping operation in timed sequence to synchronize operation of distributor 65 with the sequence of signals sent by the transmitting station has been described. As contactor 66 is moved successively across the five code contacts, the direct current mark signals will be applied through the respective code contacts to charge one or more capacitors 105, 106, 107, 108 and 109, dependent on the particular combination of code signals. These capacitors are provided to store the code signals so that they may be employed, following detection of all signals representing a single character, to operate the translating circuits for final printing of the represented character. The capacitors are connected respectively to the five code contacts on distributor 65.

It will be appreciated that dependent upon the particular combination or permutation of mark and space signals representing a particular character, the capacitors 105–109, or a particular combination thereof, will be charged in sequence by contactor 66, transferring the mark signals to the appropriate code contacts of output contacts 68 in order. For example, take the letter Y, which in the conventional five unit Baudot code is represented by mark signals for the first, third and fifth code positions separated by space signals at the second and fourth positions, the capacitors 105, 107 and 109 would be charged in response to signals representing the character Y while capacitors 106 and 108 would not be charged.

Before proceeding with a description of the circuitry employed in the utilization and translation of the charges stored in one or a combination of capacitors 105–109, further reference will be given to the timing operation of distributor 65. To illustrate such, a specific example will be described. Assuming a reception speed of 60 words per minute, the transmitted signals representing each character will be made up of a start signal followed by five code signals, each of 22 milliseconds in duration. These will be followed by a stop signal 35 ms. long. The start signal is characteristically a space signal while the stop signal is a mark signal. As heretofore noted, the five code signals intermediate the start and stop signals are made up of combinations and permutations of mark and space signals representing the individual characters.

The start and five code contacts on insulated disc 67 are preferably designed to take a 6 ms. sample in the center of each of the start and code signals. The movable contactor 66 is driven by stepping motor 69 at a rate to make a complete revolution in 163 ms. or moves at 2.21 degrees per ms. It will be noted that from the above example of the time duration of the start, code and stop signals, the signals representative of a single character as transmitted at the 60 words per minute rate require 167 ms. Thus, the contactor 66 is driven at a slightly greater speed than the transmission rate of the signals which it is designed to receive. This enables resynchronization of the stepping drive for the contactor 66 just prior to the beginning of every third received character.

To accommodate the 22 ms. time spacing between the start and adjacent code signals, the start and code contacts 68 are arcuately spaced with the center line of adjacent contacts 48.6 degrees apart. To provide for completion of the signal storage operation prior to initiation of the printing of the received character, a 12 ms. or 26.5 degree spacing is provided between the center line of the fifth code contact and the leading edge of the stop contact. The stop contact has an arcuate length of 55.2 degrees to transfer the stop signal through the distributor for 25 ms. A spacing of 13 ms. or 28.93 degrees is provided between the trailing edge of the stop contact and the leading edge of the start contact.

With the distributor 65 at rest and no code signals being detected, contactor 66 is in engagement with the center of the start contact. In this condition a continuous marking signal is characteristically transmitted so that in the circuit heretofore described start relay 75 will be maintained in a continuously energized position, preventing initiation of operation of the stepping motor 69 to drive distributor 65.

When the first start signal in the form of a space signal is received, current through lead 80 will be terminated. Start relay 75 will not immediately release due to provision of capacitor 98 and variable resistor 97 but will effect a delay in initial operation of stepping motor 69 for approximately 11 ms. This will insure that at the stepping rate of movement of contactor 66 the contactor will successively engage the code contacts at a point where they will take a 6 ms. sample at the center of the successive 22 ms. code signals. By adjustment of resistor 97 the delay time may be changed to alter the sampling position relative to the 22 ms. code signals.

After the first complete revolution, storing the code signals in the capacitors 105–109, the contactor 66 will engage the start contact. However, due to the relationship hereinabove set forth, as long as the code signals continue, the start signals, in the form of a space signal, will not re-energize relay 75 and the stepping operation of motor 69 will continue. Due to the slightly greater rate of speed of the contactor 66 in relation to the transmitted code signals, at the beginning of the third character received, contactor 66 will engage the leading edge of the start contact while the transmitted stop signal of 35 ms. duration for the preceding character is still being received. This stop signal, being a mark signal, will re-energize start relay 75 to hold up the stepping operation of motor 69 and resynchronize the stepping action of the contactor to receive the code signals for the succeeding character. It will be appreciated that the above example is given merely by way of illustration to point out the resynchronization timing achieved in the synchronizing circuit of this invention.

Reference will now be had to the circuitry shown on FIGURE 4 for utilizing and translating the charges stored in capacitors 105–109 in effecting printing of the character represented by the particular combination of stored charges. Leads 110, 111, 112, 113 and 114 connect the capacitors 105–109 respectively to the coils of code element relays 115, 116, 117, 118 and 119. Lead 120, connected to the stop contact on distributor 65, extends to the coil 121' of a transfer relay 121 with the other side of such relay coil being connected to ground at 122.

During the storing operation wherein one or a combination of capacitors 105–109 are charged by signals transferred thereto through distributor 65, the return path for the coils of code element relays 115–119 is open at contacts **121*b* of transfer relay 121. It will be noted that individual rectifiers 124 are provided in the return paths of the respective code element relays 115–119. These rectifiers serve to prevent improper energization of one or more of the code element relays when contacts 121*b* are closed to energize the particular code element relays from the particular ones of the capacitors 105–109** which have stored charges therein.

It will be seen that as distributor 65 operates and the combination and permutation of mark signals are applied to charge appropriate ones of capacitors 105–109, upon the stop signal for each character in the form of a mark signal being applied to the stop contact, voltage is applied through lead 120 to operate transfer relay 121. Thereupon, contacts **121*b* are closed so that the charges in capacitors 105–109 energize appropriate code element relays 115–119. Closure of the contacts of these code element relays completes circuits to energize matrix relays 125, 126, 127, 128 and 129. The operation of one or a combination of the matrix relays 125–129, as selected by the one or ones of the code element relays 115–119** which are energized, expands the five code positions into the functions employed in operation of the teleprinter described hereinafter.

Energization of transfer relay 121 also opens its normally closed contacts **121*a* through which an initiate relay 130 is energized from power supply 131. De-energization of initiate relay 130 results in closure of its contacts 130*a* which completes a circuit to energize a position relay 135 having the coil 135' thereof connected to ground at 136. Upon energization of position relay 135, its contacts 135*b* close to apply voltage from power supply 139 to one side of multiplier matrix 140 and contacts 135*d* close to connect ground at 136 to the other side of matrix 140**.

The functioning of and interconnections within the multiplier matrix 140 on FIGURE 4 are generally comparable to that disclosed in connection with FIGURE 38 of the heretofore mentioned James D. Durkee Patent No. 2,742,532. Accordingly, detailed description thereof herein would not appear necessary. It may be pointed out that contacts **125*a*, 126*a*, 127*a*, 128*a* and 129*a* of the matrix relays 125–129 respectively are included in a holding circuit extending through normally closed contacts 145*a* of an unlock relay 145 to power supply 131. Thus, once the selected ones of the matrix relays have been energized by the particular relays 115–119, these selected matrix relays will be held until energization of unlock relay 145. The output connections from the multiplier matrix 140 extend to terminals J, K, H, E, F, G, D, C, B and A on terminal bar 150**. These terminals are in turn connected to corresponding terminals on the teleprinter as represented and identified by the circuit shown on FGURE 5.

Turning to a consideration of the teleprinter circuitry schematically shown on FIGURE 5, the various coils shown thereon represent relay coils and solenoid operating coils generally comparable to those embodied in the teleprinter disclosed in James D. Durkee Patent No. 2,742,532. Accordingly, only brief reference to the various circuit elements on FIGURE 5 need be given with a more complete understanding of the teleprinter operation being readily available from the disclosure of this Durkee patent.

Generally the teleprinter employs a type font as shown in FIGURE 25 of such patent, with the type font being mounted for pivotal and axial movement. Pivotal movement of the type font to different extents is achieved by energizing one or another of three rotary solenoids 67, 68 and 69 as shown in FIGURE 20 of this patent. Axial movement of the type font to different extents is accomplished by energization of one or another of rotary solenoids 60 through 66 as indicated in the patent in connection with FIGURES 28, 29 and 30.

The row of seven coils 160 on FIGURE 5 which are connected respectively to terminals A, B, C, D, E, F and G in the teleprinter generally correspond to the coils of the rotary solenoids 60 through 66 embodied in the teleprinter of the hereinabove identified Durkee patent. The terminals of these coils are connected to correspondingly identified terminals on terminal bar 150 in the circuit of FIGURE 4. The common output lead 161 from the coils 160 is connected by terminal P to ground 162 (see FIGURE 4).

Similarly, the three coils 170 on FIGURE 5 generally correspond to the coils of solenoids 67, 68 and 69 as described in this Durkee patent. These coils are connected respectively to terminals H, J and K, which are in turn connected to corresponding terminals on terminal bar 150 shown on FIGURE 4. The common lead 171 for coils 170 connects through terminal M on terminal bar 150 with power supply 139.

Also shown on FIGURE 5 is the relay coil 180 for the figure printing operation, relay coil 181 for the letter printing operation and relay coil 182 for the spacing operation. Generally comparable relays are disclosed on FIGURE 38 of Durkee Patent No. 2,742,532. A ribbon feed coil 185 and a tape feed coil 186 are also provided in the teleprinter circuit to effect appropriate advance of the ribbon and the tape on which the characters are printed. A striker actuating coil 190 is provided to complete the printing operation as soon as the type font has been properly positioned by energization of one of the solenoid coils 160 and/or one of the solenoid coils 170 to dispose the proper character on the type font opposite the ribbon and tape so that the striker may drive the ribbon and tape against this character to effect printing.

Reference may now be had to the final printing function which is carried out after the code element relays 115–119 have selected and energized the proper matrix relays 125–129 and such matrix relays have in turn positioned the elements in multiplier matrix 140 so that voltage will be applied to energize the proper solenoid coil 160 and/or the proper solenoid coil 170 to physically position the type font for printing the character represented by the received code signals. At this time the position relay 135 has been energized to complete the circuits to the opposite sides of the multiplier matrix 140 so that the appropriate solenoids in the teleprinter of FIGURE 5 will be energized.

When the contactor 66 moves past the trailing end of the stop contact, transfer relay 121, which was energized by the stop signal of a marking character, is de-energized. Its contacts **121*b* open to condition the circuits, including capacitors 105–109, to receive and store charges representing the next five code signals for a particular character as distributed by distributor 65. Contacts 121*a* close to re-energize initiate relay 130. Thereupon, contacts 130*a* open, breaking the circuit to position relay 135. A capacitor 137 and resistor 138 are connected in series across the coil 135' of position relay and accordingly this relay does not immediately release. The delay provided by this RC combination provides additional time for completion of the multiplier matrix operation and physical positioning of the type font by the positioning solenoids. However, during this delay period, the distributor 65 may distribute and store the next succeeding code signals in the respective capacitors 105–109**.

Upon release of position relay 135, its contacts **135*b* and 135*d* open, breaking the circuit to the opposite sides of the multiplier matrix 140. Its contacts 135*a* close to connect power supply 139 with coil 145' of unlock relay 145. A pulse circuit, made up of a capacitor 191 and a resistor 192 connected in parallel between coil 145' and ground 193, results in unlock relay 145 being energized for only a short period of time after closure of contacts 135*a* of position relay 135. Such momentary energization effects opening of contacts 145*a*, breaking the holding circuit for the particular matrix relays 125–129** which were previously energized, thus returning these relays to a de-energized state in readiness for receipt of the next character.

Simultaneously, with closure of contacts **135*a* upon release of position relay 135, its contacts 135*c* close to connect ground 136 with the coil 195' of print relay 195. The opposite side of coil 195' is connected by lead 196 to power supply 131. Accordingly, print relay is energized to open its contacts 195*a* and 195*b*. Contacts 195*a* break the circuit from power supply 139 to terminal T on terminal bar 150, whereas opening of contacts 195*b* breaks the connection between ground 197 and terminal N on terminal bar 150**.

Referring to FIGURE 5, the striker actuating coil 190 is energized through terminal R from power supply 139 (FIGURE 4) with the return for such coil extending through contacts **182*a* of the space relay, contacts 181*a* of the letter relay and contacts 180*a* of the figure relay to terminal N. Terminal N is normally grounded (FIGURE 4) at 197 through contacts 195*b* of print relay 195. Energization of print relay breaks the ground deenergizing coil 190** to effect the final printing operation by the striker driving the ribbon and tape against the previously positioned character on the type font.

The ribbon and tape advance coils 185 and 186 are connected to terminal T which, as heretofore noted, is in turn connected (FIGURE 4) through normally closed contacts 195 on the print relay with power supply 139. Ribbon advance coil 185 is connected to terminal N which is grounded (FIGURE 4) at 197 through normally closed contacts **195*b* of print relay 195 and tape advance coil 186 is connected to terminal N through letter relay contacts 181*a* and figure relay contacts 180*a*. Thus, it will be seen that upon energization of print relay 195, the opening of its contacts 195*a* and 195*b*** will de-energize the ribbon and tape coils. This de-energization is employed to perform functions comparable to those carried out in accordance with the general disclosure of Durkee Patent No. 2,742,532.

Upon the next energization of position relay 135, caused by energization of transfer relay 121 and resulting de-energization of initiate relay 130, the circuit through contacts **135*c* will be broken, thereby deenergizing print relay 195. A resistor 198 and capacitor 199 are connected across coil 195'** of the print relay to delay its release for effecting the next succeeding print operation.

Without unnecessary repetition, a specific example will now be given reflecting the operation of the code receiver in response to frequency shift code signals representing a particular character. For purposes of such example, it may be assumed that the letter Y has been transmitted and the frequency shift keying signals representing such letter are received and applied to the drive coil 13 of the signal frequency distinguishing means shown in FIGURE 1. In the five unit Baudot code the letter Y is represented by mark signals at the first, third and fifth positions separated by space signals at the second and third positions. The first signal will be a start signal and as such is characteristically a space signal. The stop signal following the five code signals is characteristically a mark signal.

The elements 15 and 16 will respond in sequence to the signals of space and mark frequency changing the position of armature 45 of bistable relay 35 in accordance with the changes from space to mark and vice versa. Since bistable relay 35 is connected in circuit with the direct current power supply 131, the output on lead 60 to distributor 65 will be made up of a no-current start signal followed by a current signal for the first code position, a no-current signal for the second code position, a current signal for the third code position, a no-current signal for the fourth code position, a current signal for the fifth code position and a current signal for the stop signal.

The no-current start signal will initiate release of relay 75, starting the stepping operation of distributor 65. The first current signal representing the first code element will be stored in capacitor 105 as contactor 66 engages the first code contact and similarly the third and fifth current signals will be stored in succession in capacitors 107 and 109. The stop current signal will be transmitted through contactor 66 to the stop contact and thence through lead 120 to energize transfer relay 121. Code element relays 115, 117 and 119 will thereupon be energized from the charges in capacitors 105, 107 and 109 and corresponding matrix relays 125, 127 and 129 energized to condition the elements of the multiplier matrix 140. Position relay 135 will also be energized through de-energization of initiate relay 130 when transfer relay 121 is operated. The positioning of the type font will be effected by the appropriate operating solenoids controlled through matrix 140 to move the letter Y on the font opposite the ribbon and tape in readiness for engagement by the striker.

As the distributor 65 continues to operate, the stop signal through lead 120 will terminate, de-energizing transfer relay 121, whereupon initiate relay 130 is energized, resulting in release of position relay 135 after a time delay determined by RC combination 137 and 138. Release of position relay 135 momentarily energizes unlock relay 145 to de-energize the previously selected matrix relays 125, 127 and 129 and also energizes print relay 195 whereby the striker drives the ribbon and tape against letter Y on the type font to effect the final printing operation.

We claim:

1. In a code receiver for code signals made up of distinguishable space and mark signals, signal frequency distinguishing means to which the code signals are applied including a pair of vibratory elements tuned to different space and mark frequencies, each of said elements having circuit closing means associated therewith to be closed upon vibration of said elements, bistable relay means having said circuit closing means for each element connected to effect operation of said bistable relay means to a different stable output condition, and means for integrating the repetitive closings of said circuit closing means to effect differential operational control of said bistable relay means.

2. In a code receiver for code signals made up of distinguishable space and mark signals, signal frequency distinguishing means to which the code signals are applied including a pair of vibratory elements tuned to different space and mark frequencies, each of said elements having circuit closing means associated therewith to be closed upon vibration of said elements, bistable relay means having said circuit closing means for each element connected to effect operation of said bistable relay means to a different stable output condition, means for integrating the repetitive closings of said circuit closing means to effect differential operational control of said bistable relay means, and switch means in the output circuit of said bistable relay means to enable reversal of the relationship between the mark and space signals resulting from successive changes of said bistable relay means between said different stable output conditions.

3. In a receiver for code signals made up of distinguishable space and mark signals, signal frequency distinguishing means to which the code signals are applied including a pair of individual frequency sensitive vibratory elements, one of said elements being tuned to respond to space frequency signals and the other of said elements being tuned to respond to mark frequency signals, each of said elements having circuit closing means associated therewith to be closed by vibratory movement of said elements, bistable relay means having first and second stable output conditions, means connecting one of said circuit closing means to operate said relay means to said first output condition and the other of said circuit closing means to operate said relay means to said second output condition, and means for integrating the repetitive closings of said circuit closing means to effect differential operational control of said bistable relay means such that general noise frequency components in the code signals are rendered ineffective in changing the relay means between said first and second stable output conditions.

4. In a receiver for code signals made up of distinguishable space and mark signals, signal frequency distinguishing means to which the code signals are applied including a pair of individual frequency sensitive vibratory elements, one of said elements being tuned to respond to space frequency signals and the other of said elements being tuned to respond to mark frequency signals, each of said elements having circuit closing means associated therewith to be closed by vibratory movement of said elements, bistable relay means having opposed operating circuits for changing said relay means between first and second stable output conditions, each of said operating circuits including one of the circuit closing means associated with said vibratory elements, and means for integrating the repetitive closings of said circuit closing means to effect differential operational control of said bistable relay means such that general noise frequency components in the code signals are rendered ineffective in changing the relay means between said first and second stable output conditions.

5. In a receiver for code signals made up of distinguishable space and mark signals, signal frequency distinguishing means to which the code signals are applied including a pair of individual frequency sensitive vibratory elements, one of said elements being tuned to respond to space frequency signals and the other of said elements being tuned to respond to mark frequency signals, each of said elements having circuit closing means associated therewith to be closed by vibratory movement of said elements, bistable relay means having opposed operating circuits for changing said relay means between first and second stable output conditions, each of said operating circuits including one of the circuit closing means associated with said vibratory elements, and capacitive means connected in each of said operating circuits to be charged by repetitive closing of said circuits upon vibratory movement of said elements to effect differential operational control of said bistable relay means such that general noise frequency components in the code signals are rendered ineffective in changing the relay means between said first and second stable output conditions.

6. In a receiver for code signals made up of distinguishable space and mark signals, signal frequency distinguishing means to which the code signals are applied including a pair of individual frequency sensitive vibratory elements, one of said elements being tuned to respond to space frequency signals and the other of said elements being tuned to respond to mark frequency signals, each of said elements having circuit closing means associated therewith to be closed by vibratory movement of said elements, bistable relay means having a pair of relay operating coils for changing said relay means between first and second stable output conditions, each of said operating coils being connected in series with one of said circuit closing means, and capacitive means connected in parallel with each of said operating coils to be charged by repetitive closing of said circuit closing means upon vibratory movement of said elements to effect differential operational control of said bistable relay means such that general noise frequency components in the code signals are rendered ineffective in changing the relay means between said first and second stable output conditions.

7. In a receiver for code signals made up of distinguishable space and mark signals, signal frequency distinguishing means to which the code signals are applied including drive coil and a pair of vibratory reed elements associated therewith, means for applying the code signals to said drive coil, one of said elements being tuned to respond to space frequency signals and the other of said elements being tuned to respond to mark frequency signals, each of said elements having circuit closing means associated therewith to be closed by vibratory movement of said elements, bistable relay means having a pair of relay operating coils for changing said relay means between first and second stable output conditions, each of said operating coils being connected in series with one of said circuit closing means, and a capacitor connected in parallel with each of said operating coils to be charged by repetitive closing of said circuit closing means upon vibratory movement of said elements to effect differential operational control of said bistable relay means such that general noise frequency components in the code signals are rendered ineffective in changing the relay means between said first and second stable output conditions.

8. In a receiver for code signals made up of distinguishable space and mark signals, signal frequency distinguishing means to which the code signals are applied including a pair of individual frequency sensitive vibratory elements, one of said elements being tuned to respond to space frequency signals and the other of said elements being tuned to respond to mark frequency signals, each of said elements having circuit closing means associated therewith to be closed by vibratory movement of said elements, bistable relay means having a pair of relay operating coils for changing said relay means between first and second stable output conditions, each of said operating coils being connected in series with one of said circuit closing means, capacitive means connected in parallel with each of said operating coils to be charged by repetitive closing of said circuit closing means upon vibratory movement of said elements to effect differential operational control of said bistable relay means such that general noise frequency components in the code signals are rendered ineffective in changing the relay means between said first and second stable output conditions, power supply means connected to energize said operating coils through said circuit closing means, and variable resistance means connected across said circuit closing means to permit adjustment for bias between the space and mark frequency code signals.

9. In a code receiver for code signals made up of distinguishable space and mark signals, signal frequency distinguishing means to which the code signals are applied including a pair of vibratory elements tuned to different space and mark frequencies, each of said elements having a separate circuit-energizing means associated therewith to be actuated repeatedly upon vibration of its corresponding element, bistable relay means having opposed operating circuits for changing said relay means between first and second stable output conditions, each of said operating circuits being connected for control by one of said circuit-energizing means, and separate means for integrating the repetitive actuations of each circuit-energizing means and connected to effect differential operational control of said bistable relay means such that general noise frequency components in the code signals are rendered ineffective in changing the relay means from one stable condition to another.

References Cited in the file of this patent

UNITED STATES PATENTS

| | | |
|---|---|---|
| 1,876,163 | Priechenfried | Sept. 6, 1932 |
| 2,101,256 | Jones | Dec. 7, 1937 |
| 2,396,638 | Burcky | Mar. 19, 1946 |
| 2,397,884 | Rhodes | Apr. 2, 1946 |
| 2,465,185 | Anderson | Mar. 22, 1949 |
| 2,483,786 | Shenk | Oct. 4, 1949 |
| 2,816,163 | Robin | Dec. 10, 1957 |